United States Patent
Doornheim et al.

(10) Patent No.: US 9,387,652 B2
(45) Date of Patent: Jul. 12, 2016

(54) REMOVABLE CURL LABELS

(75) Inventors: Martin Doornheim, Oude-Tonge (NL); Monique Yvette Kwant, Mijdrecht (NL); Johannes Schut, Alphen aan den Rijn (NL)

(73) Assignee: Avery Dennison Corporation, Glendale, CA (US)

(*) Notice: Subject to any disclaimer, the term of this patent is extended or adjusted under 35 U.S.C. 154(b) by 991 days.

(21) Appl. No.: 11/720,960

(22) PCT Filed: Jan. 10, 2006

(86) PCT No.: PCT/US2006/000758
§ 371 (c)(1),
(2), (4) Date: Jun. 6, 2007

(87) PCT Pub. No.: WO2006/076327
PCT Pub. Date: Jul. 20, 2006

(65) Prior Publication Data
US 2009/0233067 A1    Sep. 17, 2009

Related U.S. Application Data

(60) Provisional application No. 60/642,935, filed on Jan. 10, 2005.

(51) Int. Cl.
*B32B 27/08* (2006.01)
*B32B 7/02* (2006.01)
(Continued)

(52) U.S. Cl.
CPC . *B32B 27/08* (2013.01); *B32B 7/02* (2013.01); *B32B 15/08* (2013.01); *G09F 3/10* (2013.01); *B32B 2307/54* (2013.01); *B32B 2307/554* (2013.01); *B32B 2307/558* (2013.01); *B32B 2307/5825* (2013.01); *B32B 2519/00* (2013.01);
(Continued)

(58) Field of Classification Search
CPC ........... B23B 2/08; B23B 7/02; B23B 15/08; B23B 2307/554; B23B 2307/5825; B23B 2307/54; B23B 2307/558; G09F 3/10; Y10T 428/24917; Y10T 428/24802; Y10T 428/2848; Y10T 428/24868
See application file for complete search history.

(56) References Cited

U.S. PATENT DOCUMENTS

| 4,501,845 A | 2/1985 | Baus et al. |
| 4,536,060 A | 8/1985 | Takamatsu et al. |

(Continued)

FOREIGN PATENT DOCUMENTS

| CN | 1201475 | 12/1998 |
| CN | 1608083 | 4/2005 |

(Continued)

OTHER PUBLICATIONS

Machine Translation of EP 0 951 004, Steibeis PPL GmbH, Oct. 29, 1999 (Abstract, Description, Claims, and Drawings).*

(Continued)

*Primary Examiner* — Mark Ruthkosky
*Assistant Examiner* — Laura C Powers
(74) *Attorney, Agent, or Firm* — Avery Dennison Corporation (57) ABSTRACT

This invention relates to labels, particularly removable polymeric labels for use on reusable containers. The labels contain at least two polymeric layers having different coefficients of linear thermal expansion, such that, upon exposure to elevated temperatures, the label is reversibly curled.

23 Claims, 4 Drawing Sheets

(51) Int. Cl.
*B32B 15/08* (2006.01)
*G09F 3/10* (2006.01)

(52) U.S. Cl.
CPC .. *Y10T 428/24802* (2015.01); *Y10T 428/24868* (2015.01); *Y10T 428/24917* (2015.01); *Y10T 428/2848* (2015.01)

(56) References Cited

U.S. PATENT DOCUMENTS

| | | |
|---|---|---|
| 4,562,684 A | 1/1986 | Dreher |
| 4,608,284 A | 8/1986 | Roales |
| 4,662,965 A | 5/1987 | DiFrank et al. |
| 4,725,454 A | 2/1988 | Galli et al. |
| 4,744,918 A | 5/1988 | Heppke et al. |
| 4,879,177 A | 11/1989 | Boice |
| 5,100,963 A | 3/1992 | Lin |
| 5,156,911 A | 10/1992 | Stewart |
| 5,190,609 A | 3/1993 | Lin et al. |
| 5,229,447 A | 7/1993 | Miyajima et al. |
| 5,251,048 A | 10/1993 | Doane et al. |
| 5,292,566 A | 3/1994 | Shacklett, III |
| 5,330,961 A | 7/1994 | Takeyama et al. |
| 5,384,067 A | 1/1995 | Doane et al. |
| 5,387,450 A | 2/1995 | Stewart |
| 5,437,811 A | 8/1995 | Doane et al. |
| 5,466,496 A | 11/1995 | Jin |
| 5,626,955 A | 5/1997 | Goetz et al. |
| 5,665,443 A | 9/1997 | Hata et al. |
| 5,668,614 A | 9/1997 | Chien et al. |
| 5,668,651 A | 9/1997 | Yamada et al. |
| 5,691,795 A | 11/1997 | Doane et al. |
| 5,695,682 A | 12/1997 | Doane et al. |
| 5,709,391 A | 1/1998 | Arakawa et al. |
| 5,709,937 A | 1/1998 | Adams et al. |
| 5,712,031 A | 1/1998 | Kelch et al. |
| 5,725,966 A | 3/1998 | Abe et al. |
| 5,748,277 A | 5/1998 | Huang et al. |
| 5,766,508 A | 6/1998 | Kawasumi et al. |
| 5,766,694 A | 6/1998 | West et al. |
| 5,928,803 A | 7/1999 | Yasuda |
| 5,929,960 A | 7/1999 | West et al. |
| 5,940,150 A | 8/1999 | Faris et al. |
| 5,964,975 A | 10/1999 | Hinton |
| 6,042,930 A | 3/2000 | Kelch et al. |
| 6,049,366 A | 4/2000 | Hakemi et al. |
| 6,072,549 A | 6/2000 | Faris et al. |
| 6,106,982 A | 8/2000 | Mientus et al. |
| 6,108,062 A | 8/2000 | Takeuchi et al. |
| 6,136,903 A | 10/2000 | Su et al. |
| 6,153,288 A | 11/2000 | Shih et al. |
| 6,249,332 B1 | 6/2001 | Bryan-Brown et al. |
| 6,319,428 B1 | 11/2001 | Michot et al. |
| 6,429,961 B1 | 8/2002 | Harary et al. |
| 6,508,560 B2 | 1/2003 | Epstein et al. |
| 6,621,539 B2 | 9/2003 | Nakamura |
| 6,674,504 B1 | 1/2004 | Li et al. |
| 6,680,097 B1 | 1/2004 | Amberger et al. |
| 6,680,758 B1 | 1/2004 | Faris |
| 6,726,969 B1 | 4/2004 | Balaji et al. |
| 6,761,969 B2 | 7/2004 | Li et al. |
| 6,821,592 B2 | 11/2004 | Rodick |
| 6,927,267 B1 | 8/2005 | Varela de la Rosa et al. |
| 7,144,542 B2 | 12/2006 | Holzer et al. |
| 7,217,463 B2 | 5/2007 | Henderson |
| 7,294,380 B2 | 11/2007 | Squier et al. |
| 8,535,464 B2 | 9/2013 | Lorence et al. |
| 2001/0003765 A1 | 6/2001 | Mallya |
| 2001/0018125 A1 | 8/2001 | Shibuya et al. |
| 2002/0084565 A1 | 7/2002 | Dautartas et al. |
| 2002/0119292 A1 | 8/2002 | Venkatasanthanam et al. |
| 2003/0083523 A1 | 5/2003 | Ando et al. |
| 2003/0150148 A1 | 8/2003 | Spear et al. |
| 2003/0193709 A1 | 10/2003 | Mallya et al. |
| 2003/0207065 A1 | 11/2003 | Sher et al. |
| 2004/0033349 A1 | 2/2004 | Henderson |
| 2004/0038026 A1 | 2/2004 | Li et al. |
| 2004/0219321 A1* | 11/2004 | Squier et al. ................. 428/40.1 |
| 2005/0083564 A1 | 4/2005 | Mallya et al. |
| 2005/0090619 A1 | 4/2005 | Yoshimura |
| 2006/0036556 A1 | 2/2006 | Knispel |
| 2006/0251891 A1 | 11/2006 | Aarnio |
| 2006/0263600 A1 | 11/2006 | Bartholomew et al. |
| 2007/0154668 A1 | 7/2007 | Rhee et al. |
| 2007/0213449 A1 | 9/2007 | Lewandowski |
| 2008/0118740 A1 | 5/2008 | Kuwahara et al. |
| 2009/0218307 A1 | 9/2009 | Davies et al. |
| 2010/0051200 A1 | 3/2010 | Mueller et al. |
| 2010/0285249 A1 | 11/2010 | Mitchell et al. |
| 2012/0018098 A1 | 1/2012 | Henderson |
| 2012/0034402 A1 | 2/2012 | Henderson |
| 2013/0008613 A1 | 1/2013 | Henderson |
| 2013/0146230 A1 | 6/2013 | Davies et al. |
| 2015/0255008 A1 | 9/2015 | Henderson |
| 2015/0279247 A1 | 10/2015 | Henderson |

FOREIGN PATENT DOCUMENTS

| | | |
|---|---|---|
| CN | 1791651 | 6/2006 |
| CN | 101258213 | 9/2008 |
| DE | 39 09 089 A1 | 9/1990 |
| DE | 197 16 875 A1 | 11/1997 |
| EP | 0317180 | 5/1989 |
| EP | 0471767 | 2/1992 |
| EP | 0 498 249 B1 | 8/1998 |
| EP | 0924678 | 6/1999 |
| EP | 0 951 004 A2 | 10/1999 |
| EP | 1055715 | 11/2000 |
| EP | 1116745 | 7/2001 |
| EP | 1375621 | 1/2004 |
| EP | 1688445 | 8/2006 |
| EP | 1743006 | 1/2007 |
| EP | 1866895 | 12/2007 |
| GB | 2 259 291 A | 3/1993 |
| GB | 2 411 877 A | 9/2005 |
| GB | 2411881 | 9/2005 |
| GB | 2 424 865 A | 10/2006 |
| GB | 2425107 | 10/2006 |
| JP | 5-173487 | 7/1993 |
| JP | 6-158006 | 6/1994 |
| JP | 6-266288 | 9/1994 |
| JP | 9-251272 | 9/1997 |
| JP | 11-057558 | 3/1999 |
| JP | 11-246395 | 9/1999 |
| JP | 11273636 A * | 10/1999 |
| JP | 2000-144086 | 5/2000 |
| JP | 2000-271204 | 10/2000 |
| JP | 2002-071204 | 3/2002 |
| JP | 2002-322448 | 11/2002 |
| KR | 10-0369453 | 1/2003 |
| MX | 2007008258 | 8/2007 |
| RU | 2160932 | 12/2000 |
| RU | 26272 | 11/2002 |
| WO | WO92/13901 | 8/1992 |
| WO | WO93/23496 | 11/1993 |
| WO | WO 9534263 A1 * | 12/1995 |
| WO | WO97/11996 | 4/1997 |
| WO | WO98/38547 | 9/1998 |
| WO | WO99/19415 | 4/1999 |
| WO | WO99/58421 | 11/1999 |
| WO | WO99/63400 | 12/1999 |
| WO | WO00/13887 | 3/2000 |
| WO | WO00/13888 | 3/2000 |
| WO | WO00/60407 | 10/2000 |
| WO | WO01/40853 | 6/2001 |
| WO | WO01/42325 | 6/2001 |
| WO | WO01/59024 | 8/2001 |
| WO | WO02/42832 | 5/2002 |
| WO | WO02/074874 | 9/2002 |
| WO | WO03/029002 | 4/2003 |
| WO | WO03/087251 | 10/2003 |
| WO | WO03/099953 | 12/2003 |
| WO | WO2004/061037 | 7/2004 |
| WO | WO2004/092295 | 10/2004 |

(56) References Cited

FOREIGN PATENT DOCUMENTS

| WO | 2005/085381 A1 | 9/2005 |
|---|---|---|
| WO | WO2006/033925 | 3/2006 |
| WO | WO2006/078038 | 7/2006 |
| WO | WO2006/106309 | 10/2006 |
| WO | WO2007/030583 | 3/2007 |
| WO | WO2008/057926 | 5/2008 |
| WO | WO2008/093333 | 8/2008 |
| WO | WO2008/124581 | 10/2008 |
| WO | WO2009/043975 | 4/2009 |
| WO | WO2010/027507 | 3/2010 |
| WO | WO2010/117767 | 10/2010 |
| WO | WO2010/117771 | 10/2010 |
| WO | WO2010/117774 | 10/2010 |

OTHER PUBLICATIONS

Polylactic Acid Technology; http://www.jimluntllc.com/pdfs/polylactic_acid_technology.pdf.*
The Engineering Toolbox; http://www.engineeringtoolbox.com/linear-expansion-coefficients-d_95.html.*
Machine Translation via JPO for JP 11-273636A.*
International Search Report dated May 3, 2006 for International Application No. PCT/US2006/000758.
Wood et al., "5.1: Large Area, High Resolution Portable ZBD Display", SID 02 Digest, ISSN/002-0866X/02/3301-0022-$1.00 © 2002 SID, pp. 22-25.
Pentermann et al., Letters to Nature, "Single-substrate liquid-crystal displays by photo-enforced stratification", Nature/vol. 417/May 2, 2002/www.nature.com, © 2002 Maxmillan Magazines Ltd., pp. 55-58.
International Preliminary Report on Patentability issued in corresponding IA No. PCT/US2006/000758 dated Apr. 30, 2007.
Wypych, George (2012), Handbook of Polymers . . . ChemTec Publishing, Online version available at: http://www.knovel.com.web.portal/browse/display?_EXT_KNOVEL_DISPLAY_bookid=5141&verticalID=0.
TOPAS 8007S datasheet, available at http://www.topas.com/sites/default/files/TDS_8007S_04_e_1.pdf (2014).
TOPAS 9506F-500 datasheet, available at http://www.topas.com/sites/default/files/TDS_9506F-500_e_0.pdf (2014).

* cited by examiner

REMOVABLE CURL LABELS

This application claims the benefit of provisional application Ser. No. 60/642,935 filed on Jan. 10, 2005, which is hereby incorporated herein by reference in its entirety.

TECHNICAL FIELD OF THE INVENTION

This invention relates to labels, and more particularly to removable polymeric film labels for use on reuseable containers, such as beverage bottles.

BACKGROUND OF THE INVENTION

It is common practice to apply labels to containers or bottles formed from polymers or glass. Such containers and bottles are available in a wide variety of shapes and sizes for holding many different types of materials such as detergents, chemicals, motor oil, beverages, including juices, soft drinks, alcoholic beverages, etc. The labels provide information such as the supplier of the container or the contents of the container.

Polymeric film materials and film facestocks have been described for use as labels in various fields. Polymeric labels are increasingly desired for many applications, particularly clear polymeric labels since they provide a no-label look to decorated glass and plastic containers. Paper labels block the visibility of the container and/or the contents in the container. Clear polymeric labels enhance the visual aesthetics of the container, and therefore the product, and are growing much faster than paper labels in the package decoration market as consumer product companies are continuously trying to upgrade the appearance of their products. Polymeric film labels also have superior mechanical properties, such as tensile strength and abrasion resistance.

In the bottled beverage industry, particularly the bottled beer industry, the standards to which the labels are held can be quite stringent. For example, the labeled bottles must withstand the pasteurization process. The labels must be abrasion resistant because of the demands of the bottling, packing, shipping and storage processes. The labels must also survive being immersed in ice water for extended periods of time.

In addition, the bottles used in the beverage industry are generally reused many times. The bottles must be cleaned and the labels removed prior to refilling and relabeling the bottles. Paper labels, while being generally less aesthetically desirable, are easily removed during the washing process in which the bottles are subjected to hot washing liquid such as dilute caustic soda that has been heated to 50-90° C. Because polymeric labels do not possess the water permeability of the paper labels, the polymeric labels have been found to be more difficult to completely remove with the existing washing process.

Accordingly, it would be desirable to produce polymeric film labels that can be completely removed from the bottles during the washing process, yet maintain their superior aesthetic and mechanical properties.

SUMMARY OF THE INVENTION

In one embodiment, this invention relates to a label that comprises (a) a first polymeric layer having a first coefficient of thermal expansion; (b) a second polymeric layer having a second coefficient of thermal expansion underlying the first polymeric layer, wherein the first coefficient of thermal expansion is less than the second coefficient of thermal expansion; and (c) an adhesive layer underlying the second polymeric layer, wherein the label is reversibly curled toward the first polymeric layer at a temperature at or above 50° C.

The invention further is directed to a method of detaching a label from an article, wherein the label comprises: (a) a first polymeric layer having a first coefficient of thermal expansion; (b) a second polymeric layer having a second coefficient of thermal expansion underlying the first polymeric layer, wherein the first coefficient of thermal expansion is less than the second coefficient of thermal expansion; and (c) an adhesive layer underlying the second polymeric layer; wherein the method comprises heating a washing liquid to form a hot washing liquid; and gradually detaching the label from the article, wherein the step of gradually detaching the label from the article comprises the step of exposing the label to the hot washing liquid for at least a predetermined amount of time so that the label is reversibly curled toward the first polymeric layer thereby overcoming the adhesive force of the adhesive layer.

DESCRIPTION OF THE INVENTION

The term "overlies" and cognate terms such a overlying and the like, when referring to the relationship of one or a first layer relative to another or a second layer, refer to the fact that the first layer partially or completely overlies the second layer. The first layer overlying the second layer may or may not be in contact with the second layer. For example, one or more additional layers may be positioned between the first and the second layer. The term "underlies" and cognate terms such as "underlying" and the like have similar meanings except that the first layer partially or completely lies under, rather than over the second layer.

The term "transparent" when referring to one or more layers of the label means any material beneath such layers can be seen through such layers. In reference to the use of the "transparent" or "clear" labels applied to clear containers, such as beer bottles, the bottle and the beer within the bottle are visible through the label.

The term "clear" when referring to one or more layers of the label or to the label itself means the opacity of the layers or label is less than about 5%, and the layers or the label has a haze of less than about 10%. Opacity is measured in accordance with TAPPI Test T425 os, and haze is measured in accordance with ASTM Test Method D-1003.

A label of a first embodiment comprises (a) a first polymeric layer having a first coefficient of thermal expansion; (b) a second polymeric layer having a second coefficient of thermal expansion underlying the first polymeric layer, wherein the first coefficient of thermal expansion is less than the second coefficient of thermal expansion; and (c) an adhesive layer underlying the second polymeric layer, wherein the label is reversibly curled toward the first polymeric layer at a temperature at or above 50° C.

Figure 1A:
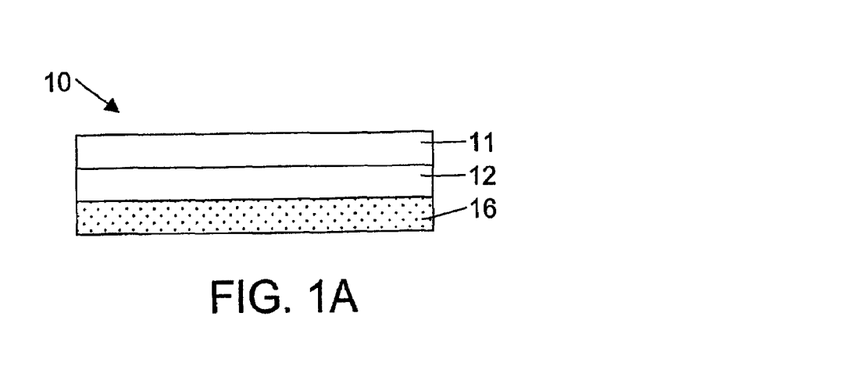
FIG. 1A is a cross section of a label construction of the present invention.

As illustrated in FIG. 1A, label 10 comprises a first polymeric layer 11, a second polymeric layer 12 underlying polymeric layer 11, and adhesive layer 16 underlying the second polymeric layer 12. At high temperatures, e.g., at or above 50° C., the second polymeric layer 12 with the higher coefficient of thermal expansion will expand to a greater degree than the first polymeric layer 11 having the lower coefficient of thermal expansion. The greater expansion of the layer 12 causes the label to curl toward layer 11. The deformation or curl of the label is reversible and the label will revert to its original shape at room temperature. The degree of curl is a function of the film thickness, Youngs modulus and coefficient of linear thermal expansion of the polymeric layers.

Figure 1B:
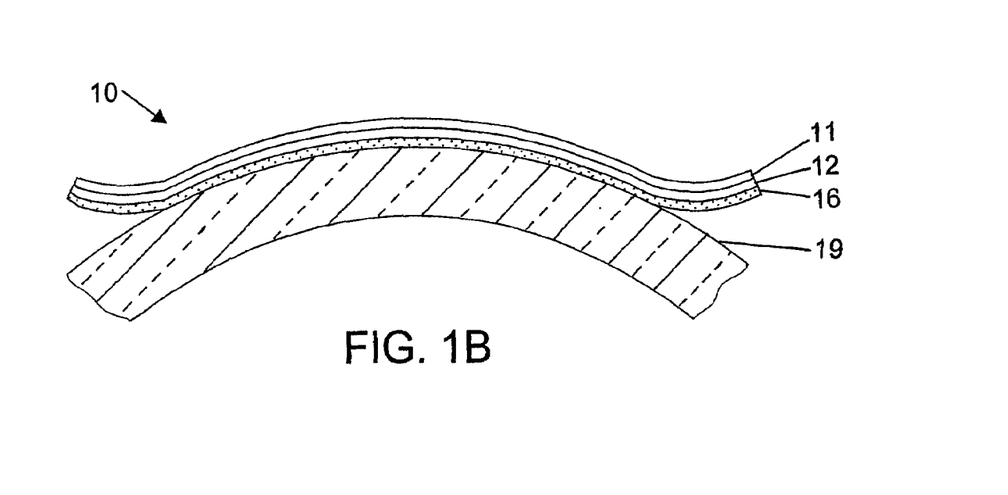
FIG. 1B is a cross section of the label of FIG. 1A as applied to a cylindrical container.

FIG. 1B shows the label of FIG. 1A bonded to the curved surface of a cylindrical container 19. In this embodiment, the main curl direction of the label extends in the circumferential direction of the container. As the container is exposed to heat, such as the hot washing liquid used in the bottling industry, the label curls toward the upper layer 11. In one embodiment, the adhesive of adhesive layer 16 possesses a lower peel adhesion at higher temperatures than at ambient or room temperature and will pull away from the surface of the container. In one embodiment, the washing liquid, particularly caustic washing liquid, acts to dissolve or chemically attack the adhesive, allowing the label to pull away from the container. As the label curls, the adhesive is exposed to a greater extent to the hot washing liquid and will eventually be completely removed from the container. The label of the present invention may also be applied to articles or containers that are flat, rather than cylindrical in shape.

Figure 2:
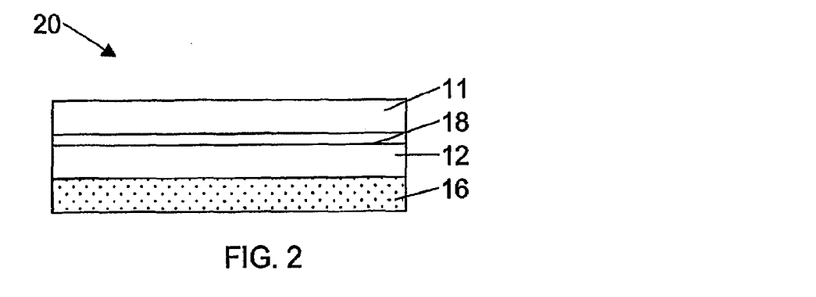
FIGS. 2-9 are cross sections of embodiments of label constructions of the present invention.

Polymeric layers 11 and 12 may be coextruded films. Alternatively, as shown in FIG. 2, the label 20 may comprise a laminated structure wherein polymeric layer 11 is bonded to polymeric layer 12 by lamination adhesive 18. In one embodiment, polymeric layers 11 and 12 are heat sealed together.

Figure 3:
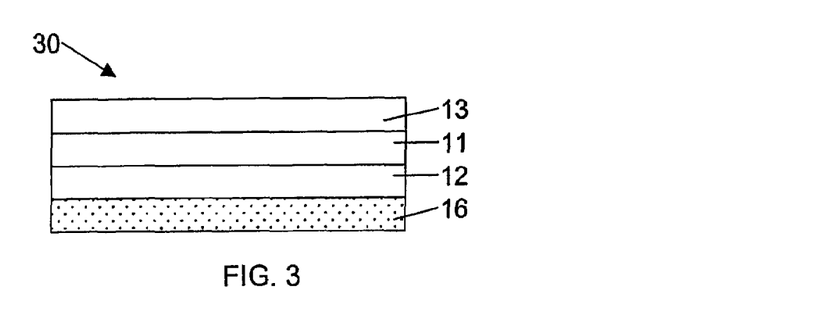
Figure 4:
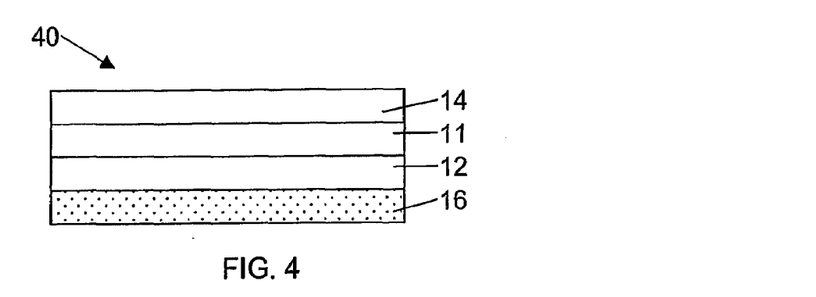

The adhesive labels of the invention may, and generally do contain other layers. For example, as shown in FIG. 3, the label 30 may contain a metal layer 13 which overlies and is in contact with first polymeric layer 11. Alternatively, a print layer 14 can be on the upper surface of polymeric layer 11 as illustrated in FIG. 4.

In one embodiment, one of polymeric layers of the label comprises a polymeric ink layer. For example, the first polymeric layer 11 may comprise a crosslinked ink that has been screen printed onto the second polymeric layer 12. Alternatively, the second polymeric layer 12 may comprise an ink layer that has been printed onto the first polymeric layer 11.

Figure 5:
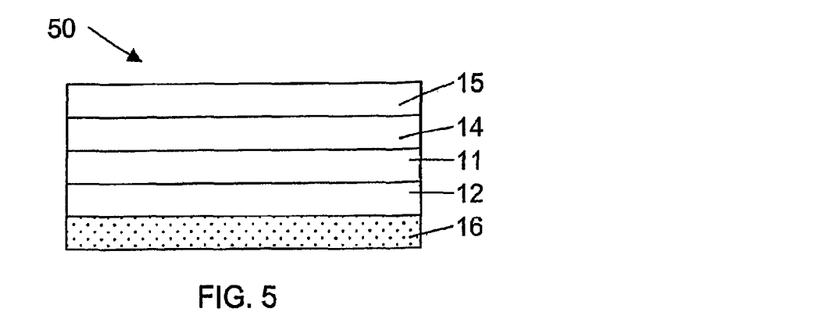

FIG. 5 illustrates label 50 which comprises first polymeric layer 11, second polymeric layer 12 underlying first polymeric layer 11, adhesive layer 16 underlying second polymeric layer 12, print layer 14 overlying first polymeric layer 11 and transparent protective layer 15 which overlies and is in contact with the upper surface of the print layer 14.

Figure 6:
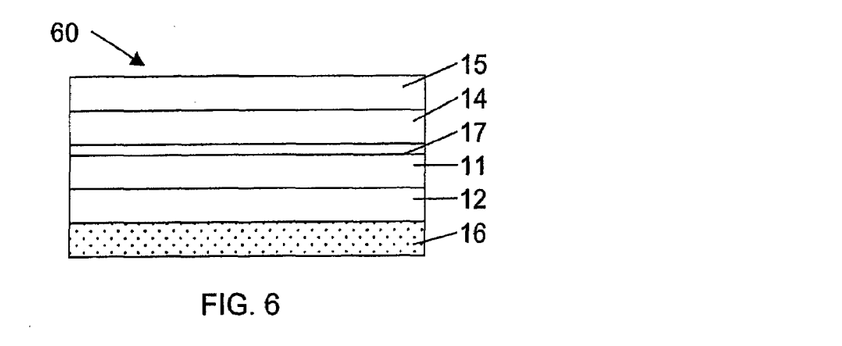

FIG. 6 illustrates label 60 which is similar to the label of FIG. 5, except that label 60 contains an additional antistatic polymer layer 17 between the print layer 14 and the first polymeric layer 11.

The labels of the invention may also contain adhesion promoting layers between one or more of the layers shown. For example, an adhesion promoting layer can be inserted between the second polymeric layer 12 and the adhesive layer 16; between the first polymeric layer 11 and the metal layer 13 or the print layer 14; etc.

Figure 7:
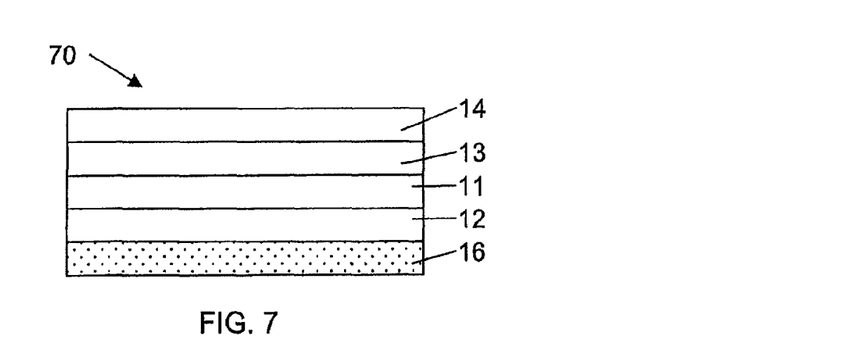
Figure 8:
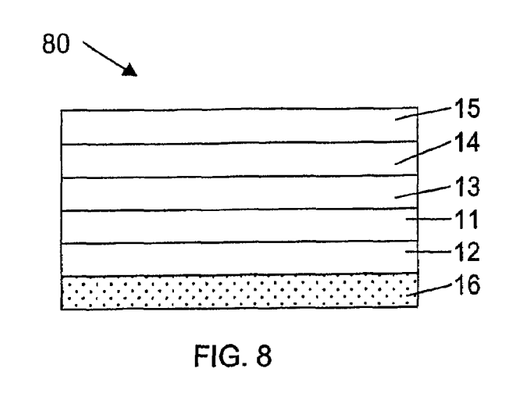

In another embodiment, the label of the present invention comprises: (a) a first polymeric layer having a first coefficient of thermal expansion; (b) a second polymeric layer having a second coefficient of thermal expansion underlying the first polymeric layer, wherein the first coefficient of thermal expansion is less than the second coefficient of thermal expansion; (c) an adhesive layer underlying the second polymeric layer; (d) a metal layer overlying the first polymeric layer; and (e) a print layer overlying the metal layer; wherein the label is reversibly curled toward the first polymeric layer at a temperature at or above 50° C. Labels of this embodiment are illustrated in FIGS. 7 and 8. In FIG. 7, label 70 comprises first polymeric layer 11, second polymeric layer 12 underlying first polymeric layer 11 and adhesive layer 16 underlying second polymeric layer 12. Metal layer 13 overlies first polymeric layer 11 and print layer 14 overlies metal layer 13. In FIG. 8, label 80 is similar to the label of FIG. 7 with the addition of transparent protective layer 15 overlying and in contact with print layer 14.

Figure 9:
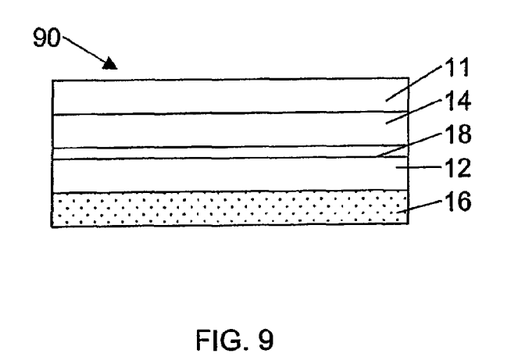

In another embodiment, illustrated in FIG. 9, the label 90 comprises a first polymeric layer 11 having an upper surface and a lower surface, a print layer 14 on the lower surface of the first polymeric layer 11. The first polymeric layer 11 with print layer 14 thereon is bonded to the second polymeric layer 12 by a lamination adhesive 18. An adhesive layer 16 is adhered to the lower surface of the second polymeric layer 12.

Polymeric layers 11 and 12 have different coefficients of thermal expansion. In an expanded state at high temperature, the layer having the higher coefficient of thermal expansion expands to curl the multilayer structure toward the layer having the lower coefficient of thermal expansion. The curl is reversible as the temperature is lowered to room or ambient temperature.

The coefficient of thermal expansion is determined by the equation:

$$\text{Coefficient of Linear Thermal Expansion}(\%) = [(B-A)/A] \times 100 \quad (1)$$

where A and B represent the measured length (cm) of a specimen of a resin after standing at 0° C. and 50° C., respectively, for 2 minutes, the specimen being 1 cm in width, 4.5 cm in length, and not more than 0.5 cm in thickness as prepared at room temperature.

When subjected to the higher temperature, such as that of the wash liquid, the label will curl and be removed from the underlying substrate to which it is adhered provided the curl force of the label ($F_{Label}$) is greater than the peel adhesion of the label to the underlying substrate ($F_{PA}$):

$$F_{Label} > F_{PA}$$

The curl force of the label, $F_{Label}$, can be determined using the following equation:

$$F_{Label} = (\alpha_2 - \alpha_1)(T - T_0)(1/8t)(E_1 E_2/(E_1 + E_2)) \quad (2)$$

wherein $\alpha_2$ is the coefficient of linear thermal expansion of the bottom layer (polymeric layer 12); $\alpha_1$ is the coefficient of linear thermal expansion of the top layer (polymeric layer 11); T is the temperature of the washing liquid, $T_0$ is the temperature at which the label is made, typically, room temperature (23° C.); t is the total thickness of the label; $E_1$ is the modulus of elasticity of the top layer (polymeric layer 11) and $E_2$ is the modulus of elasticity of the bottom layer (polymeric layer 12).

In one embodiment, the difference between the coefficient of linear thermal expansion of the bottom layer and that of the top layer, ($\alpha_2 - \alpha_1$), is greater than or equal to about $3 \times 10^{-5}$ (1/° C.). In one embodiment, $\alpha_2 - \alpha_1$ is about $7 \times 10^{-5}$ (1/° C.).

The polymeric layers useful in the present invention do not exhibit heat shrinkage beyond the typically accepted limits of heat stable pressure sensitive adhesive films, e.g., <1% at 70° and <2% at 100° C. In one embodiment, the polymeric layer 11 has a heat shrinkage of less than 4% at 80° C.

Each of the polymeric layers 11 and 12 may be a monolayer film or a multilayer film. The multilayer film may comprise from two to ten or more layers. Depending on the end use of the label, the polymeric layers may be transparent or opaque. Opaque polymeric layers generally comprise a polymer as described below and one or more pigments to provide the polymeric layer, or one layer of a multilayer polymeric film with the desired color. Pigments useful for this purpose are well known in the art. For example, white films can be prepared by introducing titanium dioxide and other white pigments into the polymer. Carbon black may be introduced to provide a black or grey film.

In one embodiment, polymeric layer 11 and polymeric layer 12 are laminated together. Polymeric layer 12 may comprise a coextruded film or may comprise a monolayer film. Polymeric layer 11 may comprise a coextruded film or may comprise a monolayer film. Polymeric layers 11 and 12 typically have a different coefficient of linear thermal expansion in the machine direction (MD) and have a very low coefficient of linear thermal expansion in the cross direction (CD) when the curl is in the machine direction of the label. Alternatively, when the curl is in the cross direction of the label, the polymeric layers 11 and 12 have different coefficient of linear thermal expansion in the CD and have a very low coefficient of linear thermal expansion in the MD. The difference in the coefficient of thermal expansion can be obtained by using different polymeric materials, for example polyethylene for polymeric layer 12 and polyethylene terephthalate for polymeric layer 11. Alternatively, the difference in coefficient of thermal expansion can be obtained by differences in molecular orientation. For example, a cross direction (trans direction) oriented film for polymer layer 11 and a machine direction oriented film for polymer layer 12.

In one embodiment, polymeric layers 11 and 12 are coextruded. For example polymeric layers 11 and 12 may comprise a polypropylene/ethylene vinyl acetate coextrudate; a polyacrylate/polyethylene coextrudate; or a polyacrylate/ethylene vinyl alcohol coextrudate. Many other coextruded combinations are possible, including coextrudates comprising more than two layers.

A wide variety of polymer film materials are useful in preparing the polymeric layers useful in the present invention. For example, the polymer film material may include polymers and copolymers such as at least one polyolefin, polyacrylate, polystyrene, polyamide, polyvinyl alcohol, poly (alkylene acrylate), poly(ethylene vinyl alcohol), poly (alkylene vinyl acetate), polyurethane, polyacrylonitrile, polyester, polyester copolymer, fluoropolymer, polysulfone, polycarbonate, styrene-maleic anhydride copolymer, styrene-acrylonitrile copolymer, ionomers based on sodium or zinc salts of ethylene methacrylic acid, cellulosics, polyacrylonitrile, alkylene-vinyl acetate copolymer, or mixtures of two or more thereof.

The polyolefins which can be utilized as the polymer film material include polymers and copolymers of olefin monomers containing 2 to about 12 carbon atoms such as ethylene, propylene, 1-butene, etc., or blends of mixtures of such polymers and copolymers. In one embodiment the polyolefins comprise polymers and copolymers of ethylene and propylene. In another embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content. Useful propylene homopolymers and copolymers are described in U.S. Pat. No. 5,709,937 (Adams et al). The copolymers include propylene-ethylene copolymers containing up to about 10% by weight of ethylene, and propylene-1-butene copolymers containing up to about 15% by weight of 1-butene. Oriented films described in the '937 patent are clear films useful as the polymeric layers in the labels of the present invention. The disclosure of U.S. Pat. No. 5,709,937 is hereby incorporated by reference.

Various polyethylenes can be utilized as the polymer film material including low, medium, and high density polyethylenes, and mixtures thereof. An example of a useful low density polyethylene (LDPE) is Rexene 1017 available from Huntsman. An example of a useful high density polyethylene (HDPE) is Formoline LH5206 available from Formosa Plastics. In one embodiment the polymer film material comprises a blend of 80 to 90% HDPE and 10-20% of LDPE.

The propylene homopolymers which can be utilized as the polymer film material in the invention, either alone, or in combination with a propylene copolymer as described herein, include a variety of propylene homopolymers such as those having melt flow rates (MFR) from about 0.5 to about 20 as determined by ASTM Test D 1238. In one embodiment, propylene homopolymers having MFR's of less than 10, and more often from about 4 to about 10 are particularly useful. Useful propylene homopolymers also may be characterized as having densities in the range of from about 0.88 to about 0.92 g/cm$^3$. A number of useful propylene homopolymers are available commercially from a variety of sources, and some useful polymers include: 5A97, available from Dow Chemical and having a melt flow of 12.0 g/10 min and a density of 0.90 g/cm$^3$; DX5E66, also available from Dow Chemical and having an MFI of 8.8 g/10 min and a density of 0.90 g/cm$^3$; and WRD5-1057 from Dow Chemical having an MFI of 3.9 g/10 min and a density of 0.90 g/cm$^3$. Useful commercial propylene homopolymers are also available from Fina and Montel.

Examples of useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135□C, a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, International Paper of Wayne, N.J. under the Uni-Rez product line, and dimer-based polyamide resins available from Bostik, International Paper, Fuller, Henkel (under the Versamid product line). Other suitable polyamides include those produced by condensing dimerized vegetable acids with hexamethylene diamine. Examples of polyamides available from International Paper include Uni-Rez 2665; Uni-Rez 2620; Uni-Rez 2623; and Uni-Rez 2695.

Polystyrenes can also be utilized as the polymeric film material and these include homopolymers as well as copolymers of styrene and substituted styrene such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillips Petroleum Co. KR-10 is believed to be a copolymer of styrene with 1,3-butadiene.

Polyurethanes also can be utilized as the polymer film material, and the polyurethanes may include aliphatic as well as aromatic polyurethanes.

The polyurethanes are typically the reaction products of (A) a polyisocyanate having at least two isocyanate (—NCO) functionalities per molecule with (B) at least one isocyanate reactive group such as a polyol having at least two hydroxy groups or an amine. Suitable polyisocyanates include diisocyanate monomers, and oligomers.

Useful polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Particularly useful polyurethanes include aromatic polyether polyurethanes, aliphatic polyether polyurethanes, aromatic polyester polyurethanes, and aliphatic polyester polyurethanes.

Examples of commercial polyurethanes include Sancure 2710® and/or Avalure UR 445® (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure 878®, Sancure 815®, Sancure 1301®, Sancure 2715®, Sancure 1828®, Sancure 2026®, and Sancure 12471® (all of which are commercially available from Noveon, Cleveland, Ohio), Bayhydrol DLN (commercially available from Bayer Corp., McMurray, Pa.), Bayhydrol LS-2033 (Bayer Corp.), Bayhydrol 123 (Bayer Corp.), Bayhydrol PU402A (Bayer Corp.), Bayhydrol 110 (Bayer Corp.), Witcobond W-320 (commercially available from Witco Performance Chemicals), Witcobond W-242 (Witco Performance Chemicals), Witcobond W-160 (Witco Performance Chemicals), Witcobond W-612 (Witco Performance Chemicals), Witcobond W-506 (Witco Performance Chemicals), NeoRez R-600 (a polytetramethylene ether urethane extended with isophorone diamine commercially available from Avecia, formerly Avecia Resins), NeoRez R-940 (Avecia), and NeoRez R-960 (Avecia).

Examples of such aliphatic polyether polyurethanes include Sancure 2710® and/or Avalure UR 445®, Sancure 878®, NeoRez R-600, NeoRez R-966, NeoRez R-967, and Witcobond W-320.

In one embodiment, one of the polymeric layers comprises at least one polyester polyurethane. Examples of these urethanes include those sold under the names "Sancure 2060" (polyester-polyurethane), "Sancure 2255" (polyester-polyurethane), "Sancure 815" (polyester-polyurethane), "Sancure 878" (polyether-polyurethane) and "Sancure 861" (polyether-polyurethane) by the company Sanncor, under the names "Neorez R-974" (polyester-polyurethane), "Neorez R-981" (polyester-polyurethane) and "Neorez R-970" (polyether-polyurethane) by the company Avecia, and the acrylic copolymer dispersion sold under the name "Neocryl XK-90" by the company Avecia.

Polyesters prepared from various glycols or polyols and one or more aliphatic or aromatic carboxylic acids also are useful film materials. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical. Another useful polyester from duPont is Selar PT-8307 which is polyethylene terephthalate.

Acrylate polymers and copolymers and alkylene vinyl acetate resins (e.g., EVA polymers) also are useful as the film forming materials in the preparation of the constructions of the invention. Commercial examples of available polymers include Escorene UL-7520 (Exxon), a copolymer of ethylene with 19.3% vinyl acetate; Nucrell 699 (duPont), an ethylene copolymer containing 11% of methacrylic acid, etc.

Ionomers (polyolefins containing ionic bonding of molecular chains) also are useful. Examples of ionomers include ionomeric ethylene copolymers such as Surlyn 1706 (duPont) which is believed to contain interchain ionic bonds based on a zinc salt of ethylene methacrylic acid copolymer. Surlyn 1702 from duPont also is a useful ionomer.

Polycarbonates also are useful, and these are available from the Dow Chemical Co. (Calibre) G.E. Plastics (Lexan) and Bayer (Makrolon). Most commercial polycarbonates are obtained by the reaction of bisphenol A and carbonyl chloride in an interfacial process. Molecular weights of the typical commercial polycarbonates vary from about 22,000 to about 35,000, and the melt flow rates generally are in the range of from 4 to 22 g/10 min.

In one embodiment, one of the polymeric layers may comprise fluorinated polymer. The fluorinated polymer includes a thermoplastic fluorocarbon such as polyvinylidene fluoride (PVDF). The fluorinated polymer also can include copolymers and terpolymers of vinylidene fluoride. A useful thermoplastic fluorocarbon is the polyvinylidene fluoride known as Kynar, a trademark of Pennwalt Corp. This polymer is a high molecular weight (400,000) polymer which provides a useful blend of durability and chemical resistance properties. Generally, a high molecular weight PVDF resin, with a weight average molecular weight of about 200,000 to about 600,000 is used.

The polymeric film material may be free of inorganic fillers and/or pigments for clear films and clear labels, or the polymeric film material may be cavitated and/or contain inorganic fillers and other organic or inorganic additives to provide desired properties such as appearance properties (opaque or colored films), durability and processing characteristics. Nucleating agents can be added to increase crystallinity and thereby increase stiffness. Examples of useful materials include calcium carbonate, titanium dioxide, metal particles, fibers, flame retardants, antioxidant compounds, heat stabilizers, light stabilizers, ultraviolet light stabilizers, antiblocking agents, processing aids, acid acceptors, etc. Opaque and/or white polymeric films are often utilized when the labels described herein do not contain a metal layer overlying the outer polymeric layer.

The polymer film material is chosen to provide a continuous polymer film in the film structures of this invention with the desired properties such as improved tensile strength, elongation, impact strength, tear resistance, and optics (haze and gloss). The choice of polymeric film forming material also is determined by its physical properties such as melt viscosity, high speed tensile strength, percent elongation etc. In one embodiment, clear or transparent polymeric films are used in the label construction when clear or transparent labels are desired.

The thickness of the each polymeric layer is at least 5 microns, or at least 15 microns. The total thickness of the label film is from about 2.5 microns to about 250 microns, or from about 25 to about 125 microns. In one embodiment the total thickness of the label film is from about 25 to about 75 microns. Each polymeric layer may comprise a single layer, or can be a multilayer film of two or more adjacent layers. For example the polymeric layer can comprise one layer of a polyolefin and one layer of a blend of a polyolefin and a copolymer of ethylene and vinyl acetate (EVA). In another embodiment the polymeric layer comprises three layers, a base or core layer of, for example, a polyolefin, and skin layers in both sides of the base or core layer which may be comprised of the same or different polymer blends. The individual layers of a multilayer film may be selected to provide desirable properties.

The polymeric films useful in the labels herein can be manufactured by those processes known to those skilled in the art such as by casting or extrusion. In one embodiment, the films are manufactured by polymer extrusion or coextrusion processes. The extrudate or coextrudate of polymeric film materials is formed by simultaneous extrusion from a suitable known type of extrusion or co-extrusion die, and in the case of a coextrudate, the layers are adhered to each other in a permanently combined state to provide a unitary coextrudate.

In addition to coextrusion, the multilayer films useful in the present invention may be prepared by extrusion of a continuous film to form one layer followed by the application of one or more additional layers on the extruded layer by extrusion of one or more additional layers; by lamination of a preformed polymer film to a preformed functional film; or by deposition of additional layers on the preformed film from an emulsion or solution of a polymeric film forming material.

In one embodiment, the polymeric films used in the present invention are not oriented. That is, the films are not subjected to a hot-stretching and annealing step. In other embodiments, the films contained in the labels used in the present invention may be oriented in the machine direction (uniaxially) or in both the machine and cross directions (biaxially) by hot-stretching and annealing by techniques well known to those skilled in the art. For example, the films may be hot-stretched in the machine direction only at a ratio of at least 2:1 and more often, at a ratio of between about 2:1 to about 9:1. After the film has been hot stretched, it is generally passed over annealing rolls where the film is annealed or heat-set at temperatures in the range of from about 50° C., more often 100° C. to about 150° C., followed by cooling. In another embodiment, the polymeric film is a biaxially oriented.

It is desirable that the films exhibit a degree of stiffness in the machine direction and the cross direction to facilitate handling, printing and dispensing. Thus, in one embodiment, the stiffness in the machine direction, and the cross direction should be at least about 14 Gurley (mg), as determined using TAPPI Test T543 pm and in a further embodiment the Gurley stiffnesses in both directions are within about 5 Gurley units (sometimes referred to as a balanced stiffness).

Polymer films useful in the labels of the present invention are available commercially from a variety of sources such as Avery Dennison Corp., Painesville, Ohio; AMTOPP, a division of Interplast Group LTD, Livingston, N.J. 07039, Exxon Mobil Chemical Co., Macdon, N.Y. 14502; AET Films, New Castle, Del. 19720; and UCB Films Inc., Smyrna, Ga. 30080. Clear films and white films are available.

The surface energy of the surfaces of the polymeric films can be enhanced by treatments such as corona discharge, flame, plasma, etc. to provide the surfaces with desirable properties such as improved adhesion to subsequently applied layers. Procedures for corona treating and flame treating of polymer films are well known to those skilled in the art. In one embodiment, a polymeric film is corona discharge treated on the upper surface and flame treated on the lower surface.

In one embodiment of the invention, polymeric layer 11 comprises a polyethylene terephthalate (PET) film laminated to polymeric layer 12 which comprises a biaxially oriented polypropylene (BOPP) film.

As noted above, the labels of the invention may also comprise a metal layer 13 overlying the first polymeric layer 11. In one embodiment, the metal layer is in contact with and is adhered to the upper surface of the first polymeric layer 11 which may have been previously corona treated or flame treated. The metal may be applied to the polymeric layer by any known methods such as electroplating, sputtering, vacuum metalizing, printing, etc. Chemical primers or other adhesion promoting compositions may in some instances, be applied to the surface of the polymeric layer to increase the adhesion of the metal to the polymeric layer.

The metal of the metal layer may be any of a number of metals, including tin, chromium, nickel, stainless steel, copper, aluminum, indium, gold, silver, and alloys of one or more thereof. Useful metallized films are available commercially.

Although not shown in FIGS. 1-9, the labels of the present invention may also contain a layer of an ink-receptive composition on the polymeric layer 11 or the metal layer 13 that enhances the printability of the polymeric layer or metal layer, and the quality of the print layer thus obtained. A variety of such compositions are known in the art, and these compositions generally include a binder and a pigment, such as silica or talc, dispersed in the binder. The presence of the pigment decreases the drying time of some inks. Such ink-receptive compositions are described in U.S. Pat. No. 6,153,288 (Shih et al) and the disclosure of this patent is hereby incorporated by reference.

The labels the present invention may, and generally do, comprise one or more print layers. In one embodiment, illustrated in FIGS. 7 and 8, a print layer 14 is adhered to the upper surface of the metal layer 13. In the embodiment illustrated in FIGS. 4 and 5, the print layer 14 is in contact with the upper surface of the first polymeric layer 11.

The print layer may be an ink or graphics layer, and the print layer may be a mono-colored or multi-colored print layer depending on the printed message and/or the intended pictorial design. These include, variable imprinted data such as serial numbers, bar codes, trademarks, etc. The thickness of the print layer is typically in the range of about 0.5 to about 10 microns, and in one embodiment about 1 to about 5 microns, and in another embodiment about 3 microns. The inks used in the print layer include commercially available water-based, solvent-based or radiation-curable inks. Examples of these inks include Sun Sheen (a product of Sun Chemical identified as an alcohol dilutable polyamide ink), Suntex MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

In one embodiment, the print layer comprises a polyester/vinyl ink, a polyamide ink, an acrylic ink and/or a polyester ink. The print layer is formed in the conventional manner by depositing, by gravure printing or the like, an ink composition comprising a resin of the type described above, a suitable pigment or dye and one or more suitable volatile solvents onto one or more desired areas of the metal layer. After application of the ink composition, the volatile solvent component(s) of the ink composition evaporate(s), leaving only the non-volatile ink components to form the print layer. An example of a suitable resin for use in forming a polyester ink is ViTEL® 2700 (Bostik-Findley)—a copolyester resin having a high tensile strength (7000 psi) and a low elongation (4% elongation). A ViTEL® 2700-based polyester ink composition may comprise 18% ViTEL® 2700, 6% pigment, 30.4% n-propyl acetate (NP Δc) and 45.6% toluene. As can readily be appreciated, ViTEL® 2700 is, by no means, the only polyester resin that may be used to formulate a polyester ink, and solvent systems, other than an NP Ac/toluene system, may be suitable for use with ViTEL® 2700, as well as with other polyester resins. An example of a polyester adhesive composition comprises 10.70%, by weight, ViTEL® 2300 polyester resin; 10.70%, by weight, ViTEL® 2700 polyester resin; 1.1%, by weight, BENZOFLEX S404 plasticizer; 1.1%, by weight, HULS 512 adhesion promoter; 19.20%, by weight, toluene; and 57.10%, by weight, methyl ethyl ketone.

The adhesion of the ink to the surface of the metal layer can be improved, if necessary, by techniques well known to those skilled in the art. For example, as mentioned above, an ink primer or other ink adhesion promoter can be applied to the metal layer or the polymeric film layer before application of the ink. Alternatively the surface of the polymeric film can be corona treated or flame treated to improve the adhesion of the ink to the polymeric film layer.

Useful ink primers may be transparent or opaque and the primers may be solvent based or water-based. In one embodiment, the primers are radiation curable (e.g., UV). The ink primer is typically comprised of a lacquer and a diluent. The lacquer is typically comprised of one or more polyolefins, polyamides, polyesters, polyester copolymers, polyurethanes, polysulfones, polyvinylidine chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof. Examples of the diluents that can be used include alcohols such as ethanol, isopropanol and butanol; esters such as ethyl acetate, propyl acetate and butyl acetate; aromatic hydrocarbons such as toluene and xylene; ketones such as acetone and methyl ethyl ketone; aliphatic hydrocarbons such as heptane; and mixtures thereof. The ratio of lacquer to diluent is dependent on the viscosity required for application of the ink primer, the selection of such viscosity being within the skill of the art. An example of a ink primer material that can be used is CLB04275F-Prokote Primer (a product of Sun Chemical Corporation identified as a solvent based primer useful with inks and coatings). The ink primer layer may have a thickness of from about 1 to about 4 microns or from about 1.5 to about 3 microns.

A transparent polymer protective topcoat or overcoat layer may be present in the labels of the invention. In the embodiments illustrated in FIGS. 5, 6 and 8, a transparent topcoat or overcoat layer 15 overlies the print layer 14. The protective topcoat or overcoat layer provide desirable properties to the label before and after the label is affixed to a substrate such as a container. The presence of a transparent topcoat layer over the print layer may, in some embodiments provide additional properties such as antistatic properties stiffness and/or weatherability, and the topcoat may protect the print layer from, e.g., weather, sun, abrasion, moisture, water, etc. The transparent topcoat layer can enhance the properties of the underlying print layer to provide a glossier and richer image. The protective transparent protective layer may also be designed to be abrasion resistant, radiation resistant (e.g., UV), chemically resistant, thermally resistant thereby protecting the label and, particularly the print layer from degradation from such causes. The protective overcoat may also contain antistatic agents, or anti-block agents to provide for easier handling when the labels are being applied to containers at high speeds. The protective topcoat constructions of the labels used in the invention may also be selected to provide labels useful on containers subjected to subsequent liquid processing such as bottle washing/rinsing, filling and pasteurization, or liquid immersion (e.g., ice bath) without displaying adverse consequences such as label lifting or hazing. The protective layer may be applied to the print layer by techniques known to those skilled in the art. The polymer film may be deposited from a solution, applied as a preformed film (laminated to the print layer), etc.

When a transparent topcoat or overcoat layer is present, it may have a single layer or a multilayered structure. The thickness of the protective layer is generally in the range of about 12.5 to about 125 microns, and in one embodiment about 25 to about 75 microns. Examples of the topcoat layers are described in U.S. Pat. No. 6,106,982 which is incorporated herein by reference.

The protective layer may comprise polyolefins, thermoplastic polymers of ethylene and propylene, polyesters, polyurethanes, polyacryls, polymethacryls, vinyl acetate homopolymers, co- or terpolymers, ionomers, and mixtures thereof.

The transparent protective layer may contain UV light absorbers and/or other light stabilizers. Among the UV light absorbers that are useful are the hindered amine absorbers available from Ciba Specialty Chemical under the trade designations "Tinuvin". The light stabilizers that can be used include the hindered amine light stabilizers available from Ciba Specialty Chemical under the trade designations Tinuvin 111, Tinuvin 123, (bis-(1-octyloxy-2,2,6,6-tetramethyl-4-piperidinyl) sebacate; Tinuvin 622, (a dimethyl succinate polymer with 4-hydroxy-2,2,6,6-tetramethyl-1-piperidniethanol); Tinuvin 770 (bis-(2,2,6,6-tetramethyl-4-piperidinyl)-sebacate); and Tinuvin 783. Also useful light stabilizers are the hindered amine light stabilizers available from Ciba Specialty Chemical under the trade designation "Chemassorb", especially Chemassorb 119 and Chemassorb 944. The concentration of the UV light absorber and/or light stabilizer is in the range of up to about 2.5% by weight, and in one embodiment about 0.05% to about 1% by weight.

The transparent protective layer may contain an antioxidant. Any antioxidant useful in making thermoplastic films can be used. These include the hindered phenols and the organo phosphites. Examples include those available from Ciba Specialty Chemical under the trade designations Irganox 1010, Irganox 1076 or Irgafos 168. The concentration of the antioxidant in the thermoplastic film composition may be in the range of up to about 2.5% by weight, and in one embodiment about 0.05% to about 1% by weight.

The adhesive layer 16 of the label may comprise a pressure sensitive adhesive (PSA). The PSA may comprise an adhesive that exhibits a drop in peel adhesion at elevated temperatures. In one embodiment, the adhesive comprises an emulsion based adhesive that exhibits a significant reduction in peel adhesion from room temperature to 50° C.

A description of useful pressure sensitive adhesives may be found in *Encyclopedia of Polymer Science and Engineering*, Vol. 13. Wiley-Interscience Publishers (New York, 1988). Additional description of useful PSAs may be found in *Polymer Science and Technology, Vol.* 1, Interscience Publishers (New York, 1964). Conventional PSAs, including acrylic-based PSAs, rubber-based PSAs and silicone-based PSAs are useful. The PSA may be a solvent based or may be a water based adhesive. Hot melt adhesives may also be used. In one embodiment, the PSA comprises an acrylic emulsion adhesive.

The labels of the present invention have particular utility in the beverage industry, wherein the beverage containers are subjected to relatively rough handling. The processes the labeled containers have to withstand may include filling, packing, shipping and storage, as well as pasteurization and recycling operations. The labels may be applied to glass, polymeric and metal containers. Clear labels may be used to achieve a "no look" label where the presence of the label is not very apparent to the consumer.

A release liner may be adhered to the adhesive layer to protect the adhesive layer during transport, storage and handling prior to application of the label to a substrate.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A pressure sensitive adhesive label comprising:
   a first polymeric layer having a first coefficient of linear thermal expansion;
   a second polymeric layer that is not pre-stretched and having a second coefficient of linear thermal expansion underlying the first polymeric layer, wherein the first coefficient of linear thermal expansion is less than the second coefficient of linear thermal expansion; and
   a pressure sensitive adhesive layer underlying the second polymeric layer;
   wherein at least the second polymeric layer is configured to expand upon exposure to a temperature at or above 50° C. so as to reversibly curl the label in the direction of the first polymeric layer;
   wherein said adhesive exhibits a drop in peel adhesion at elevated temperature; and
   wherein the first polymeric layer and the second polymeric layer are coextruded from a coextrudate selected from the group consisting of a polyacrylate/polyethylene coextrudate and a polyacrylate/ethyl vinyl alcohol coextrudate.

2. The label of claim 1 wherein the adhesive has a lower peel adhesion at temperatures at or above 50° C. than at room temperature.

3. The label of claim 1 wherein the label is bondable to a cylindrically curved surface of an article and the main expansion direction of the label extends in the circumferential direction of the article.

4. The label of claim 1 wherein the first polymeric layer and the second polymeric layer are coextruded.

5. The label of claim 1 wherein the first polymeric layer and the second polymeric layer are bonded to each other by a lamination adhesive.

6. The label of claim 1 wherein the first polymeric layer comprises a multilayer film.

7. The label of claim 1 wherein the second polymeric layer comprises a multilayer film.

8. The label of claim 1 wherein the first polymeric layer is transparent.

9. The label of claim 1 further comprising a metal layer.

10. The label of claim 9 wherein the metal layer overlies the first polymeric layer.

11. The label of claim 1 further comprising a print layer.

12. The label of claim 11 wherein the print layer overlies the first polymeric layer.

13. The label of claim 9 further comprising a print layer overlying the metal layer.

14. The label of claim 11 further comprising a transparent protective layer overlying the print layer.

15. The label of claim 1 wherein the adhesive comprises an emulsion based adhesive.

16. The label of claim 1 wherein the difference in coefficients of linear thermal expansion is greater than or equal to about $3 \times 10\text{-}5$ (1/° C.).

17. A pressure sensitive adhesive label that can be adhesively attached to an article and detached in a hot washing liquid, comprising:
   a first polymeric layer having a first coefficient of linear thermal expansion;
   a second polymeric layer that is not pre-stretched having a second coefficient of linear thermal expansion underlying the first polymeric layer, wherein the first coefficient of linear thermal expansion is less than the second coefficient of linear thermal expansion; and
   a pressure sensitive adhesive layer underlying the second polymeric layer;
   wherein at least the second polymeric layer is configured to expand upon exposure to a temperature at or above 50° C. so as to reversibly curl the label in the direction of the first polymeric layer; and
   wherein said adhesive exhibits a drop in peel adhesion at elevated temperature;
   wherein the first polymeric layer and the second polymeric layer are coextruded from a coextrudate selected from the group consisting of a polyacrylate/polyethylene coextrudate and a polyacrylate/ethyl vinyl alcohol coextrudate.

18. A method of detaching a pressure sensitive adhesive label from an article, wherein the label comprises:
   a first polymeric layer having a first coefficient of linear thermal expansion;
   a second polymeric layer that is not pre-stretched having a second coefficient of linear thermal expansion underlying the first polymeric layer, wherein the first coefficient of linear thermal expansion Is less than the second coefficient of linear thermal expansion; and
   a pressure sensitive adhesive layer underlying the second polymeric layer;
   wherein at least the second polymeric layer is configured to expand upon exposure to a temperature at or above 50° C. so as to reversibly curl the label in the direction of the first polymeric layer; and
   wherein said adhesive exhibits a drop in peel adhesion at elevated temperature;
   the method comprising heating a washing liquid to form a hot washing liquid; and gradually detaching the label from the article, wherein the step of gradually detaching the label from the article comprises the step of exposing the label to the hot washing liquid for at least an amount of time so that the label is curled by expansion of at least the second polymeric layer toward the first polymeric layer thereby overcoming the adhesive force of the adhesive layer;
   wherein the first polymeric layer and the second polymeric layer are coextruded from a coextrudate selected from the group consisting of a polyacrylate/polyethylene coextrudate and a polyacrylate/ethyl vinyl alcohol coextrudate.

19. The method of claim 18 wherein the hot washing liquid comprises caustic soda.

20. The method of claim 18 wherein the hot washing liquid has a temperature in the range of about 50° C. to about 90° C.

21. The label of claim 1 wherein the first polymeric layer is an expandable first polymeric layer that is configured to expand upon exposure to a temperature at or above 50° C.

22. The label of claim 1, wherein the first polymeric layer and the second polymeric layer are coextruded from a polyacrylate/polyethylene coextrudate.

23. The label of claim 1, wherein the first polymeric layer and the second polymeric layer are coextruded from a polyacrylate/ethyl vinyl alcohol coextrudate.

* * * * *